United States Patent
Biskup et al.

(10) Patent No.: US 10,505,455 B1
(45) Date of Patent: Dec. 10, 2019

(54) BOOST CONVERTERS AND METHODS FOR USING AN INVERTER AND A MOTOR

(71) Applicant: Atieva, Inc., Grand Cayman (KY)

(72) Inventors: Richard Biskup, Sunnyvale, CA (US); Mingkai Mu, Fremont, CA (US); Emad Dlala, Pleasanton, CA (US)

(73) Assignee: ATIEVA, INC., Grand Cayman (KY)

( * ) Notice: Subject to any disclaimer, the term of this patent is extended or adjusted under 35 U.S.C. 154(b) by 0 days.

(21) Appl. No.: 16/284,458

(22) Filed: Feb. 25, 2019

(51) Int. Cl.
| | |
|---|---|
| *B60L 53/16* | (2019.01) |
| *H02M 3/158* | (2006.01) |
| *H02M 7/48* | (2007.01) |
| *H02M 7/06* | (2006.01) |
| *H02J 7/00* | (2006.01) |

(52) U.S. Cl.
CPC .......... *H02M 3/1582* (2013.01); *B60L 53/16* (2019.02); *H02J 7/0013* (2013.01); *H02M 7/06* (2013.01); *H02M 7/48* (2013.01)

(58) Field of Classification Search
CPC ...... H02M 3/158; H02M 3/1582; H02M 7/06; H02M 7/48; H02J 7/0013; H02J 7/0027; B60L 53/10; B60L 53/11; B60L 53/16
See application file for complete search history.

(56) References Cited

U.S. PATENT DOCUMENTS

| | | | | |
|---|---|---|---|---|
| 8,525,474 | B2* | 9/2013 | Chen | B60L 58/40 320/109 |
| 10,020,768 | B2* | 7/2018 | Bovo | H02P 27/04 |
| 2012/0133309 | A1* | 5/2012 | Sean | H02J 7/14 318/139 |
| 2015/0061381 | A1* | 3/2015 | Biskup | B60L 3/0046 307/10.1 |
| 2015/0183328 | A1* | 7/2015 | Kusch | B60L 58/26 320/109 |
| 2016/0214493 | A1 | 7/2016 | Herke et al. | |

* cited by examiner

*Primary Examiner* — Matthew V Nguyen
(74) *Attorney, Agent, or Firm* — Van Court & Aldridge LLP

(57) ABSTRACT

Embodiments discussed herein refer to backwards compatible charging circuits and methods for charging a battery to a relatively high voltage level regardless of whether the charging station is capable of supplying power at that relatively high voltage level. The circuitry and methods according to embodiments discussed herein can use the motor and power electronics (e.g., inverter) to provide a voltage boosting path to increase the charge voltage from a legacy voltage level (e.g., a relatively low voltage level) to a native voltage level (e.g., a relatively high voltage level). When a native voltage charging station is charging the battery, the circuitry and methods according to embodiments discussed herein can use a native voltage path for supplying power, received from the charging station at the native voltage, to the battery.

20 Claims, 8 Drawing Sheets

BOOST CONVERTERS AND METHODS FOR
USING AN INVERTER AND A MOTOR

FIELD OF THE INVENTION

The present disclosure relates to electric vehicles and plug-in hybrid electric vehicles, and in particular to boost converter topologies and methods for using an inverter and a motor.

BACKGROUND

Electric vehicles (EV) and plug-in hybrid electric vehicles (PHEV) use batteries to power one or more motors to propel the vehicle. The batteries are designed to be charged and operate within a fixed range of voltage levels. As EV and PHEV technology matures, a trend is emerging to use the batteries at higher voltages. Higher voltages reduce the current, which translates into cheaper cables and connectors for higher charging rate. However, as battery voltage standards evolve, legacy charging stations may not be designed or able to supply power at the requisite voltage levels to satisfy the higher voltage levels required of the batteries. Accordingly, what is needed are circuits and methods to cheaply and efficiently charge higher voltage batteries regardless of whether the charging station is a high voltage charging station or a legacy charging station.

BRIEF SUMMARY

Embodiments discussed herein refer to backwards compatible charging circuits and methods for charging a battery to a relatively high voltage level regardless of whether the charging station is capable of supplying power at that relatively high voltage level. The circuitry and methods according to embodiments discussed herein can use the motor and power electronics components (e.g., inverter) to provide a voltage boosting path to increase the charge voltage from a legacy voltage level (e.g., a relatively low voltage level) to a native voltage level (e.g., a relatively high voltage level). When a native voltage charging station is charging the battery, the circuitry and methods according to embodiments discussed herein can use a native voltage path for supplying power, received from the charging station at the native voltage, to the battery.

In one embodiment, a vehicle transportation system is provided that can include a charging port, a drivetrain system, a plurality of contactors coupled to the charging port and the drivetrain system, and control circuitry coupled to drivetrain system and the plurality of contactors. The drivetrain system can include a battery, a motor, and power electronics components coupled to the battery and the motor. The control circuitry operative to charge the battery using one of a native path and a legacy path based on a determination of whether power supplied to the charging port is at a native voltage level or a legacy voltage level. The native path can include at least one contactor of the plurality of contactors that is closed to enable the native voltage level to charge the battery. The legacy path can include at least one contactor of the plurality of contactors, the motor, and the power electronics components, wherein the control circuitry controls duty cycle operation of the power electronics components such that the power electronics components and motor operate as a boost converter to boost the legacy voltage level to the native voltage level to charge the battery.

In another embodiment, a method for charging a battery in a vehicle transportation system including a port, a plurality of contactors, a battery, a motor, and power electronics components is provided. The method can include determining whether supply power voltage available at the port is provided at a legacy voltage level or a native voltage level. If the supply power voltage is provided at the legacy voltage level, the method can activate at least two of the plurality of contacts to supply power to the battery via a legacy path, the legacy path comprising the motor and the power electronics components, and control operation of the power electronics components to boost the supply power voltage from the legacy voltage level to the native voltage level such that the battery is charged at the native voltage level. If the supply power voltage is provided at the native voltage level, the method can activate at least two of the plurality of contacts to supply power to the battery via a native path such that battery is charged at the native voltage level.

In yet another embodiment, battery charging circuitry is provided that includes a charging port; a motor including first, second, and third stators; an inverter including first, second, and third phase switches coupled to the first, second, and third stators, respectively; a first bus coupled to the inverter and a positive terminal for a battery; a second bus coupled to the inverter and a negative terminal for the battery; a first contactor coupled to the charging port, the third stator and the third phase switches; a second contactor coupled to the charging port and the second bus; and control circuitry. The control circuitry is operative to route power to the positive terminal via a native path when a supply voltage is determined to be a native voltage level, and route power to the positive terminal via a legacy path when the supply voltage is determined to be a legacy voltage level.

A further understanding of the nature and advantages of the embodiments discussed herein may be realized by reference to the remaining portions of the specification and the drawings.

DETAILED DESCRIPTION

Illustrative embodiments are now described more fully hereinafter with reference to the accompanying drawings, in which representative examples are shown. Indeed, the disclosed communication systems and methods may be embodied in many different forms and should not be construed as limited to the embodiments set forth herein. Like numbers refer to like elements throughout.

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

Figure 1:
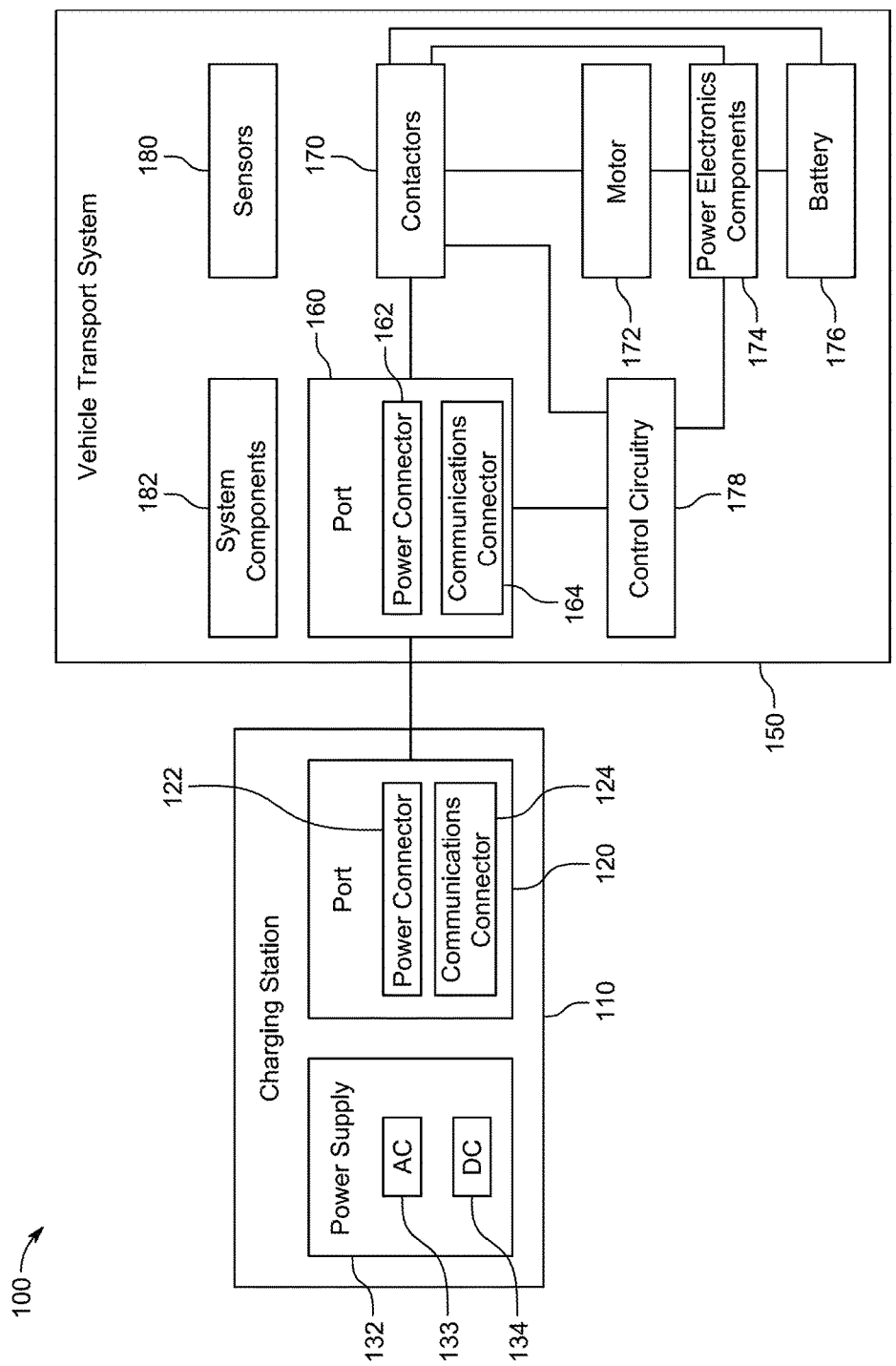
FIG. 1 shows illustrative system according to an embodiment.

FIG. 1 shows illustrative system 100 that can include charging station 110 and vehicle transport system 150 according to an embodiment. Charging station 110 can include port 120 that is designed to couple to port 160 of vehicle system 150. Ports 120 and 160 may sometimes be referred to as a charging plug or charging gun. Port 120 may include power connectors 122, communication connectors 124, and any other suitable connector (not shown). Port 120 may embody one of the known standards for transferring charge from electric vehicle supply equipment (EVSE) to a vehicle such as, for example, one-phase AC connectors such as a SAE J1772, three-phase AC connectors such as a Mennekes type 2, combined charging connectors (that include both AC and DC pins), DC only connectors, and the CHAdeMO connector. Charging station 110 (also known as EVSE) can also include power supply 132, which may provide the AC power 133, DC power 134, or both AC and DC power required by vehicle system 150. Charging station 110 can include other components such as data storage, a controller, and communications circuitry (all of which are not shown to avoid overcrowding the drawing). The data storage may be any suitable storage mechanism for storing large amounts of data such as a hard-drive or a solid state drive, or cloud storage. The controller may be operative to control the flow of data from port 120 to the data storage to the communications circuitry. The communications circuitry may include any two-way wired or wireless communications for transmitting data between the data storage and a remote server (not shown).

Vehicle transport system 150 can include port 160, which may include power connectors 162, communication connectors 164, and any other connections (not shown). Port 160 may be the reciprocal version of port 120 and is designed to interface therewith. System 150 can include contactors 170, motor 172, power electronics components 174, battery 176, control circuitry 178, sensors 180, and system components 182. Contactors 170 may be electronically controlled mechanical switches that can be selectively turned ON and OFF to route power directly to motor 172, power electronics components 174, and/or battery 176. Motor 172 may represent the one or more motors used to propel system 150. Motor 172 may be, for example, a three phase induction motor. Power electronics components 174 may include the electronics required to drive motor 172. In some embodiments, power electronics components 174 may include an inverter (e.g., a traction inverter). Battery 176 may be a relatively high voltage battery that supplies power to the motor, which propels the car. The voltage level or range of voltages at which battery 176 operates may be referred to herein as a native voltage. Sensors 180 can include, for example, a global positioning system, an inertial measurement system, a radar unit, a laser rangefinder/LIDAR unit, and a camera. System components 180 can include propulsion system elements such as, for example, motor 172, engine, transmission, and wheels/tires, control system elements such as, for example, a steering unit, throttle, brake unit, sensor fusion algorithms, computer vision systems, navigation system, and an obstacle avoidance system, and peripherals such as, for example, a wireless communications system, a touch screen, a microphone, and a speaker. System components 182 can also include a computer system, which can include one or more processors and instructions. System 150 can include data storage for storing, for example, data collected by sensors 174.

Ports 120 and 160 can include mating sets of electromechanical contacts that provide a physical connection at the vehicle interface for the power conductors, an equipment grounding conductor, a control pilot conductor, and a proximity sense conductor to provide a signal that helps reduce electrical arcing of the coupler during disconnect. Thus, the interface typically has at least five contacts that perform the interface functions. In addition, the coupler can include a latching mechanism to prevent inadvertent or accidental decoupling. The latching mechanism may also serve to properly align the connector with the vehicle inlet by requiring a latch element projecting from the connector to be registered with a cooperating latch element in the vehicle inlet.

When ports 120 and 160 are connected together, a handshaking operation can commence so that vehicle system 150 can determine what type of power can be supplied by charging station 110. Charging station 110 may supply AC power 133 or DC power 134. For example, in some embodiments, charging station 110 may be a legacy charging station that provides power at a legacy voltage level. As defined herein, a legacy voltage level is a relatively low voltage level that is substantially less than a native voltage level of the battery (e.g., battery 176). As defined herein, a native voltage level is a relatively high voltage level at which the battery is charged and operates. Both native and legacy voltage levels refer to a DC voltage level. As another example, charging station 110 may be a native charging station that provides power at the native voltage level. Embodiments discussed herein can route power from port 160 to battery 176 through a legacy path, which boosts the legacy voltage to the native voltage, or a native path, based on which type of charging station 110 is connected to port 160. As defined herein, a native path refers to a path where the power supplied by the charging station is at the native voltage and requires no manipulation of the voltage (e.g., boosting of voltage from one level to another level) to deliver power to the battery. As defined herein, a legacy path refers to a path where the power supplied by the charging station is at the legacy voltage and manipulation of the voltage level is required to boost the voltage to the native voltage for delivery to the battery.

Although vehicle transport system 150 is described in the context of an automobile or truck, system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, and trolleys. Other vehicles are possible as well.

Figure 2:
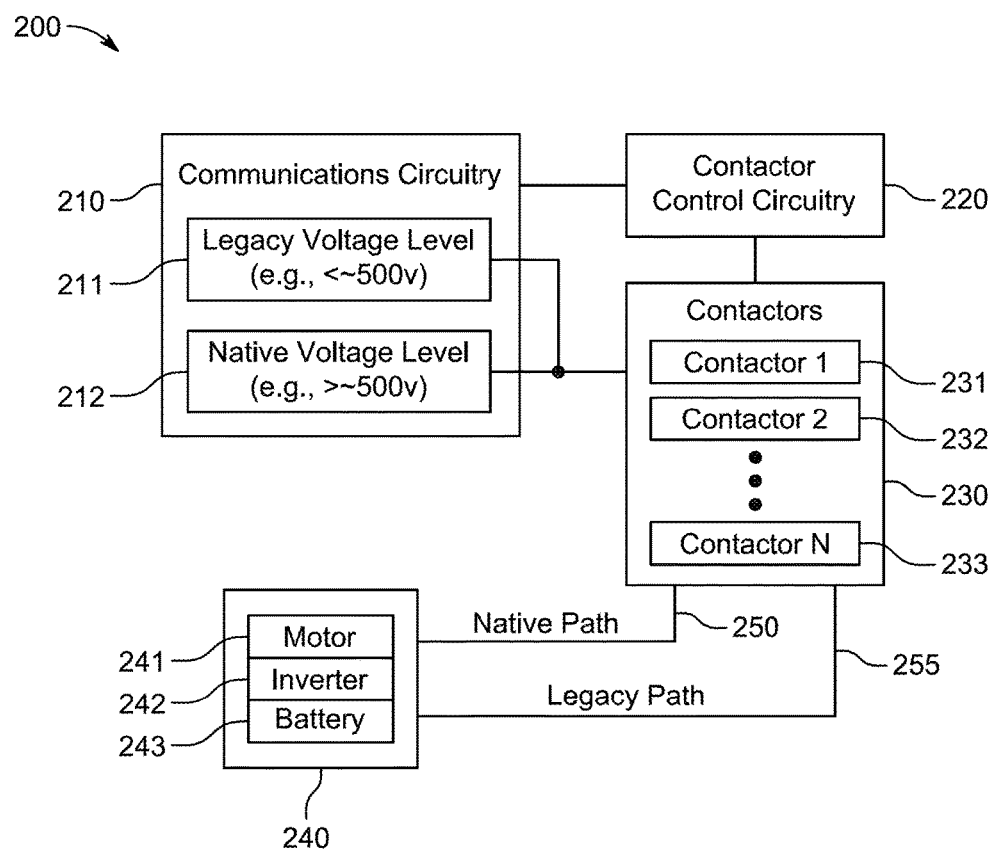
FIG. 2 shows an illustrative block diagram of power routing circuitry according to an embodiment.

FIG. 2 shows an illustrative block diagram of power routing circuitry (PRC) 200 according to an embodiment.

PRC 200 can include communication circuitry 210, contactor control circuitry 220, contactors 230, and drivetrain subsystem 240, which can include motor 241, inverter 242, and battery 243. PRC 200 also shows native path 250 and legacy path 255 both existing between contactors 230 and drivetrain sub system 240. During a connection event with a charging station (e.g., station 110), circuitry 210 may determine (e.g., via a handshake process) whether the available power is legacy voltage level power 211 or native voltage level power 212. Depending on this determination, contactor control circuitry 220 can selectively activate one or more of contactors 231-233 to route power over one of the native path 250 and legacy path 255. Although not specifically shown in FIG. 2, native path 250 can include motor 241 and/or inverter 242. Whether motor 241 and/or inventor 242 are included in path 250 depends on the specific boosting topology used according to embodiments discussed herein. Also not specifically shown in FIG. 2, legacy path 255 can include motor 241 and inverter 242. Battery 243 is the end terminus of both paths 250 and 255.

Figure 3:
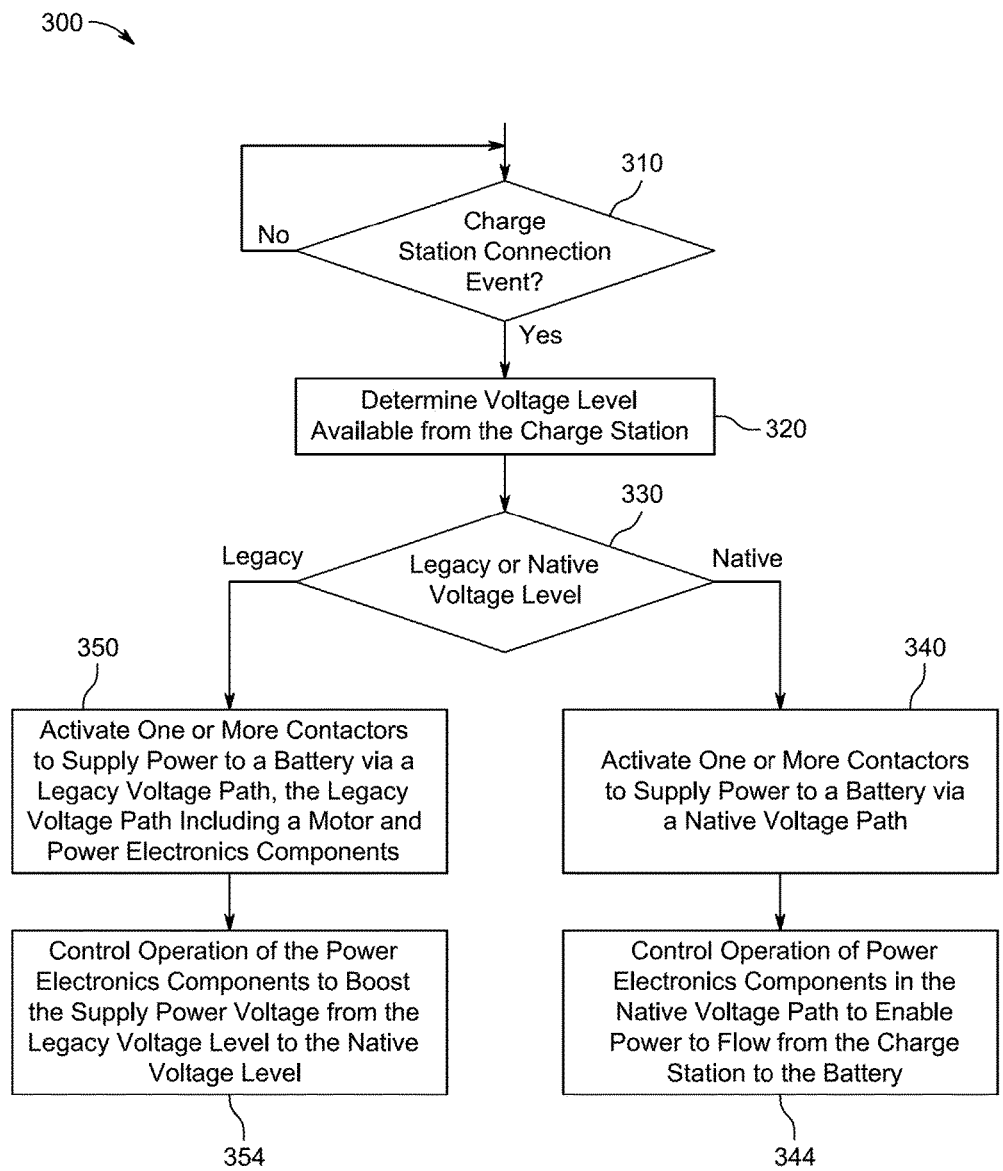
FIG. 3 shows illustrative process for routing power from a charging station to a battery according to an embodiment.

FIG. 3 shows illustrative process 300 for routing power from a charging station to a battery according to an embodiment. Process 300 may be implemented within vehicle transport system 150 or PRC 200, for example. Starting at step 310, a determination is made whether there is charge station connection event. If the determination is NO, process 300 may loop back to step 310. If the determination is YES, process 300 may determine a voltage level available from the charging station, at step 320. If the determination indicates that the available voltage level corresponds to a native voltage level (at step 330), process 300 may activate one or more contactors to supply power to a battery via a native voltage path. In many embodiments, two contactors may be closed to complete the native path. Depending on the circuit topology used to convey power from the charging station to the battery, process 300 may optionally control operation of power electronics components (e.g., one or more transistors in an inverter) in the native voltage path to enable power to flow from the charge station to the battery, as shown in step 344. For example, circuit topologies in FIGS. 6 and 7 may utilize step 344.

If the determination at step 330 indicates that the available voltage corresponds to legacy voltage level, process 300 may activate one or more contacts to supply power to a battery via a legacy voltage path (step 350). In many embodiments, two contactors may be closed to complete the legacy path. The legacy voltage path can include a motor and inverters. At step 354, the power electronics components can be controlled, in combination with the motor, to boost the supply power voltage level to the native voltage level. Exemplary circuit topologies for boosting the voltage are shown and described in connection with FIGS. 4-7 below.

It should be understood that the steps in FIG. 3 are merely illustrative and that additional steps may be added and the order of the steps may be rearranged.

Figure 4:
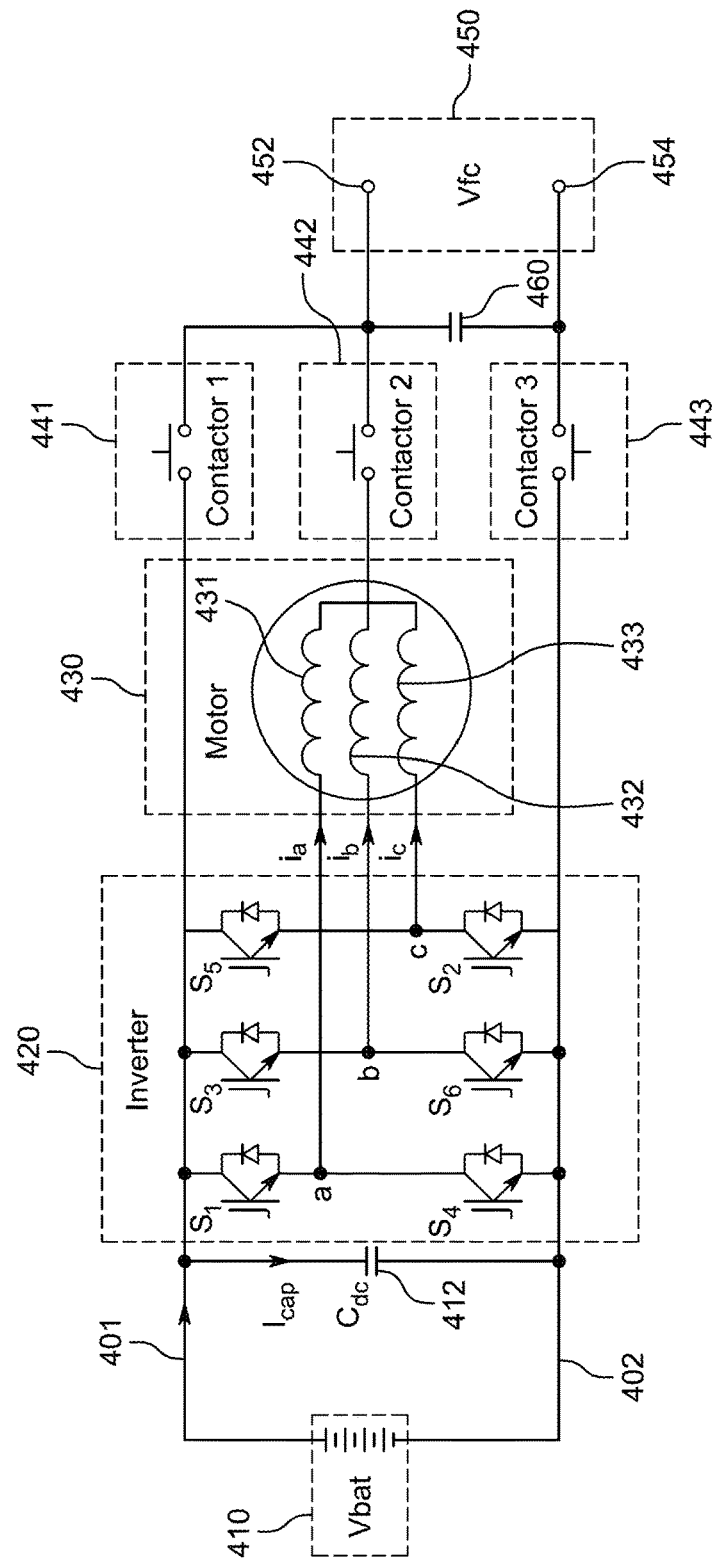
FIG. 4 shows illustrative circuit diagram of charging circuitry according to an embodiment.

FIG. 4 shows illustrative circuit diagram of circuitry 400 according to an embodiment. Circuitry 400 can include battery 410, capacitor 412, inverter 420 with switches $S_1$-$S_6$, motor 430 with stators 431-433, contactors 441, 442, and 443, input port 450, and capacitor 460. Battery 410 provides DC power to inverter 420, which converts the DC power to three phase AC power to drive motor 430. As shown, stator 431 is connected to a node existing between switches $S_1$ and $S_4$, stator 432 is connected to a node existing between switches $S_3$ and $S_6$, and stator 433 is connected to a node existing between switches $S_5$ and $S_2$. Battery 410 is connected to switches $S_1$, $S_3$, $S_5$ and contactor 441 via positive bus 401 and to switches $S_2$, $S_4$, and $S_6$ and contactor 443 via negative bus 402. Contactors 441-443 are connected to input port 450. Contactors 441 and 442 are connected to terminal 452 of port 450 and contactor 443 is connected to terminal 454 of port 450. In addition, contactor 442 is connected to motor 430. In some embodiments, as illustrated in FIG. 4, contactor 442 can be connected to all three stators 431-433. In particular, contactor 442 can be connected to the center tap of stators 431-433.

When input port 450 receives power, for example, from a charging station, the voltage applied across terminals 452 and 454 is a DC voltage. If the DC voltage is determined to be at a native voltage level, contactors 441 and 443 are closed, and contactor 442 remains open. This provides a native path in which the DC voltage flows through contactor 441 over bus 401 directly to battery 410. If the DC voltage is determined to be at a legacy voltage level, contactor 441 is open, and contactors 442 and 443 are closed. This provides a legacy path through which the DC voltage flows through contactor 442, motor 430, and inverter 420 to battery 410. The legacy path includes a boost converter by using stators 441-443 as inductors and switches $S_1$-$S_6$, or a subset thereof, as the switching elements of the boost converter.

Figure 5:
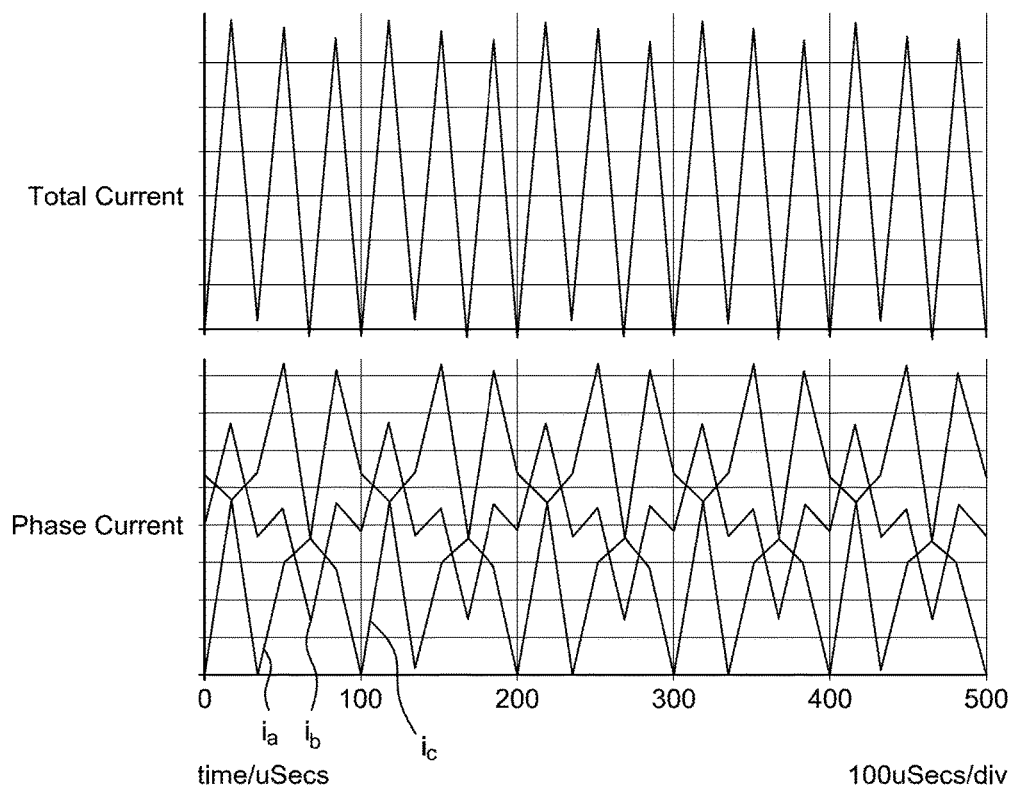
FIG. 5 shows illustrative timing diagrams of currents in charging circuitry of FIG. 4, according to an embodiment.

Control circuitry (not shown) may control switches $S_1$-$S_6$ to operate legacy path as a boost converter to up-convert the legacy voltage level to a native voltage level. The control circuitry may control the frequency and duty cycle at which switches $S_1$-$S_6$ are operated. In addition, the control of switches $S_1$-$S_6$ can be based on several factors such as the legacy voltage level, the native voltage level, the inductance value of stators 441-443, and the capacitance values of capacitors 412 or 460. In some embodiments, it may be desirable to interleave the three phase currents, $i_a$, $i_b$, and $i_c$ such that each phase current is interleaved to have a 120 degree difference. This is illustrated in FIG. 5, which shows total current being supplied to battery 410 and interleaving phase currents $i_a$, $i_b$, and $i_c$. If desired, the phase current can be non-interleaved. In addition, additional phases may be used, such as, for example, six different phase currents that are 60 degrees apart. It should be appreciated that any number of phases, or other implementation of interleaving or non-interleaving may be used. Different approaches may be used, for example, to control AC ripple of the DC voltage being supplied to battery 410.

In some scenarios, it may be desirable to charge capacitor 460 to the native voltage level or the legacy voltage level prior to a connection event with a charging station. This may be accomplished by closing contactors 442 and 443 using inverter 420 and motor 430 as a buck converter. This enables battery 430 to pre-charge capacitor 460 immediately prior to port 450 receiving power from the charging station.

After the charging event is complete, it may be desirable to discharge capacitor 460. Capacitor 460 can be discharged by operating the boost converter and routing the charge to battery 410.

Figure 6:
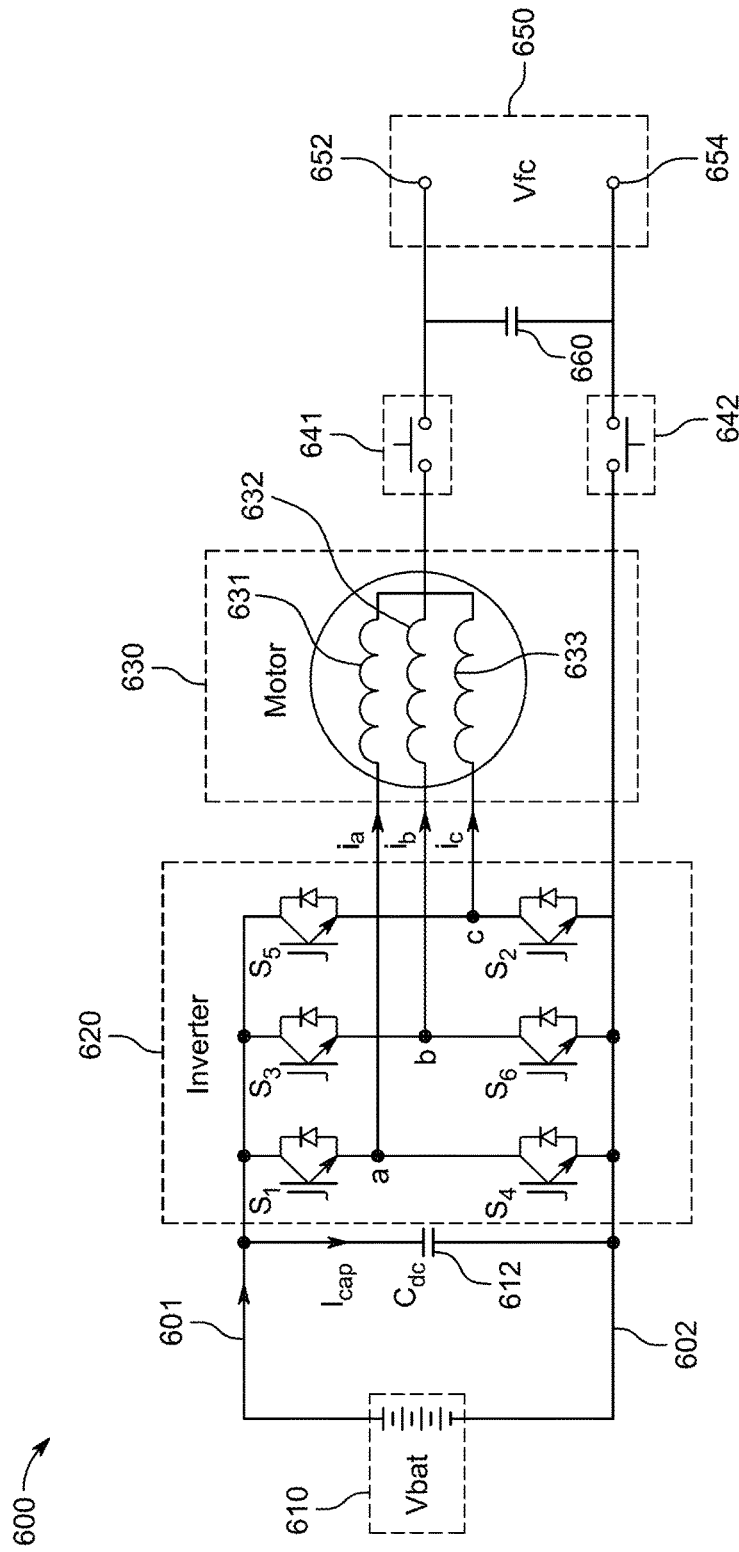
FIG. 6 shows another illustrative circuit diagram of charging circuitry according to an embodiment.

FIG. 6 shows illustrative circuitry 600 according to an embodiment. Circuitry 600 can include battery 610, capacitor 612, inverter 620 with switches $S_1$-$S_6$, motor 630 with stators 631-633, contactors 641 and 642, input port 650, and capacitor 660. Battery 610 provides DC power to inverter 620, which converts the DC power to three phase AC power to drive motor 630. As shown, stator 631 is connected to a node existing between switches $S_1$ and $S_4$, stator 632 is connected to a node existing between switches $S_3$ and $S_6$, and stator 633 is connected to a node existing between switches $S_5$ and $S_2$. Battery 610 is connected to switches $S_1$, $S_3$, and $S_{5s}$ via positive bus 601 and to switches $S_2$, $S_4$, and $S_6$ and contactor 642 via negative bus 602. Contactor 641 is connected to terminal 652 of input port 650 and the center tap of motor 630 (e.g., the center tap winding of stators 631-633). Contactor 642 is connected to terminal 654 of port 650.

Circuitry 600 is similar to circuitry 400 except that contactor 441 has been eliminated. Motor 630 and inverter 620 are still used to boost a legacy voltage level to a native voltage level. When the voltage level at port 650 is determined to be at the native voltage level, contactors 641 and 642 are closed. Switches $S_1$, $S_3$, and $S_5$, or a subset thereof, are turned ON and switches $S_2$, $S_4$, and $S_6$, or as subset thereof, are turned OFF. Thus, the native path can include contactor 641, stators 631-633, and switches $S_1$, $S_3$, and $S_5$.

When the voltage level at port 650 is determined to be at the legacy voltage level, contactors 641 and 642 are closed, switches $S_1$-$S_6$ are duty cycled controlled by control circuitry (not shown). Thus, the legacy path can include contactors 641 and 642, stators 631-633, and switches $S_1$-$S_6$ and is operative to boost the native voltage level to the native voltage level.

The aforementioned interleaving of phase currents, use of multiple phase currents, and the non-interleaving of phase currents may be used in connection with circuitry 600. In addition, the pre-charging of capacitor 660 and discharging thereof can also be applied.

Figure 7:
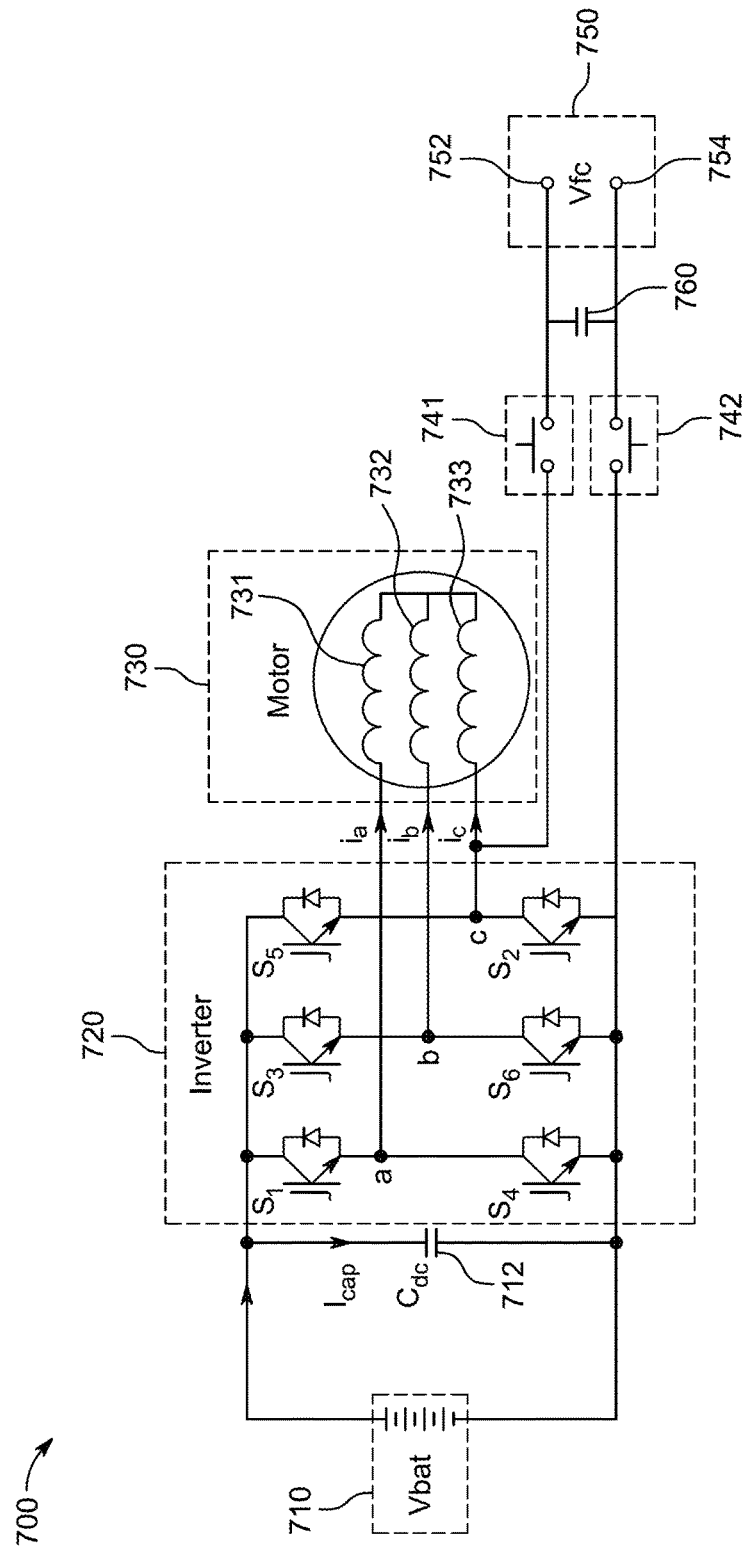
FIG. 7 shows yet another illustrative circuit diagram of charging circuitry according to an embodiment.

FIG. 7 shows illustrative circuitry 700 according to an embodiment. Circuitry 700 can include battery 710, capacitor 712, inverter 720 with switches $S_1$-$S_6$, motor 730 with stators 731-733, contactors 741 and 742, input port 750, and capacitor 760. Battery 710 provides DC power to inverter 720, which converts the DC power to three phase AC power to drive motor 730. As shown, stator 731 is connected to a node existing between switches $S_1$ and $S_4$, stator 732 is connected to a node existing between switches $S_3$ and $S_6$, and stator 733 is connected to a node existing between switches $S_5$ and $S_2$. Battery 710 is connected to switches $S_1$, $S_3$, and $S_5$ via positive bus 701 and to switches $S_2$, $S_4$, and $S_6$ and contactor 742 via negative bus 702. Contactor 741 is connected to terminal 752 of input port 750 and an AC input of one of the stators motor 730 (e.g., shown here as AC input to stator 733). Contactor 742 is connected to terminal 754 of port 750.

Circuitry 700 is similar to circuitry 600 except that contactor 741 is now connected to one of the AC input ports of motor 730, shown here to be connected to stator 733, as opposed to the center tap of motor 630. Connecting to an AC input port is easier than connecting to the center tap. Motor 730 and inverter 720 are still used to boost a legacy voltage level to a native voltage level. When the voltage level at port 750 is determined to be at the native voltage level, contactors 741 and 742 are closed. In one approach, switches $S_1$ and $S_3$ are turned ON and switches $S_2$, $S_4$, $S_5$, and $S_6$ are turned OFF. Thus, the native path can include contactors 741 and 742, stators 731-733, and switches $S_1$ and $S_3$. The current flows into stator 733 and is split between stators 731 and 732 as the current flows through switches $S_1$ and $S_3$. In another approach, switch $S_5$ is turned and switches $S_1$, $S_2$, $S_3$, $S_4$, and $S_6$ are turned off. Thus, the native path can include contactors 741 and 742, and switch $S_5$.

When the voltage level at port 750 is determined to be at the legacy voltage level, contactors 741 and 742 are closed, switches $S_1$, $S_3$, $S_4$, and $S_6$ are duty cycled controlled by control circuitry (not shown), and switches $S_2$ and $S_5$ are turned OFF. Thus, the legacy path can include contactors 741 and 742, stators 731-733, and switches $S_1$, $S_3$, $S_4$, and $S_6$ and is operative to boost the legacy voltage level to the native voltage level.

The aforementioned interleaving of phase currents, use of multiple phase currents, and the non-interleaving of phase currents may be used in connection with circuitry 700. In addition, the pre-charging of capacitor 760 and discharging thereof can also be applied.

Figure 8:
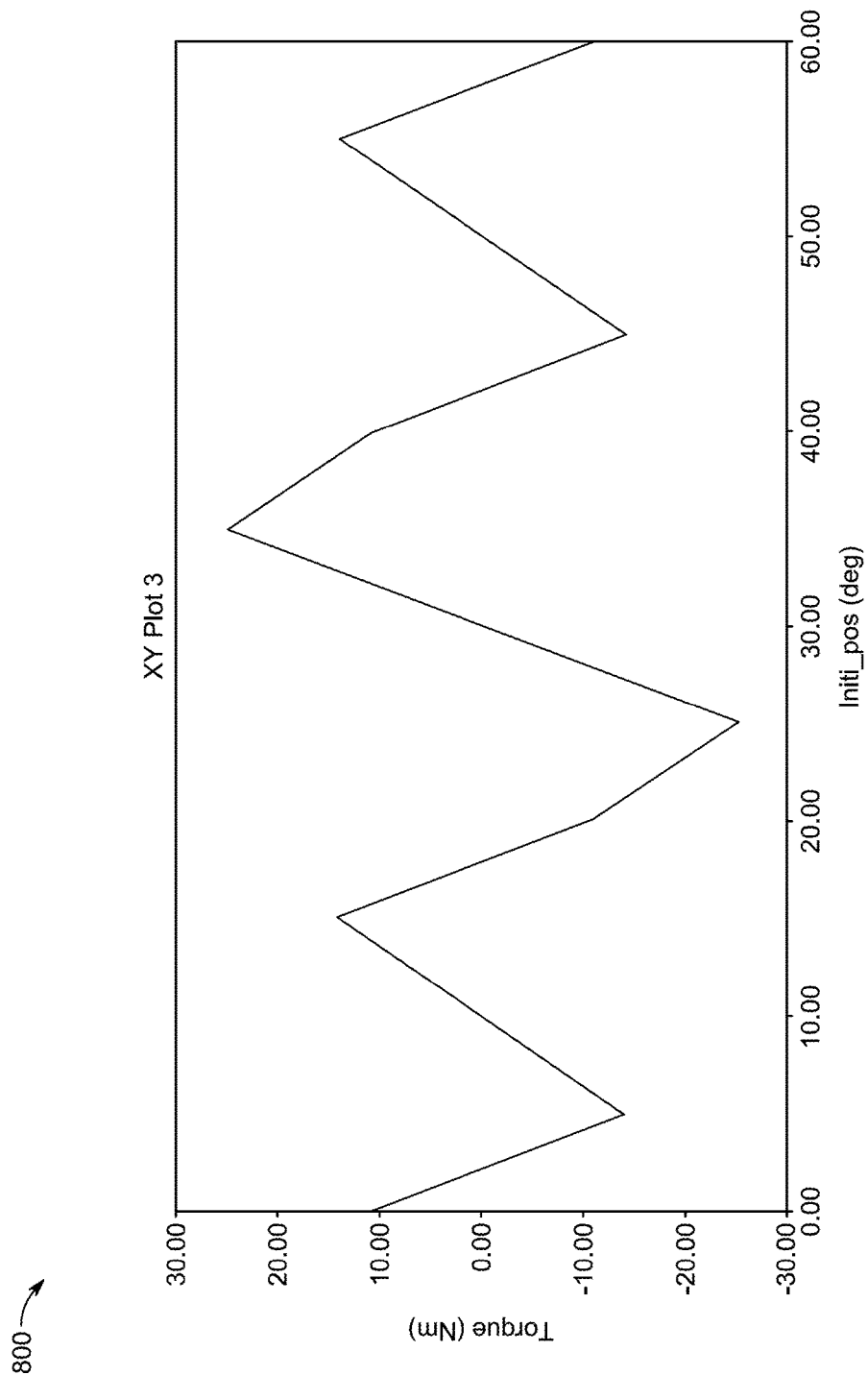
FIG. 8 shows an illustrative plot of torque generated by the motor while the battery is charging according to an embodiment.

FIG. 8 shows an illustrative plot 800 of torque generated by the motor while the battery is charging at the rate of 100 amps according to an embodiment. Plot 800 shows torque versus rotor position of the motor. Embodiments discussed herein use the motor of the transportation system as part of the current path to charge the battery. Plot 800 shows that if 100 amps of DC are applied to each stator, the maximum torque generated by the motor can be sufficiently handled by the vehicle system when it is in park.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

Moreover, any processes described with respect to FIGS. 1-9, as well as any other aspects of the invention, may each be implemented by software, but may also be implemented in hardware, firmware, or any combination of software, hardware, and firmware. They each may also be embodied as machine- or computer-readable code recorded on a machine- or computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices. The computer-readable medium can also be distributed over network-coupled computer systems so that the computer readable code is stored and executed in a distributed fashion. For example, the computer-readable medium may be communicated from one electronic subsystem or device to another electronic subsystem or device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module or state machine discussed herein may be provided as a software construct, firmware construct, one or more hardware components, or a combination thereof. For example, any one or more of the state machines or modules may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules or state machines are merely illustrative, and that the number, configuration, functionality, and interconnection of existing modules may be modified or omitted, additional modules may be added, and the interconnection of certain modules may be altered.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A vehicle transportation system, comprising:
  a charging port;
  a drivetrain system comprising:
    a battery;
    a motor; and
    power electronics components coupled to the battery and the motor;
  a plurality of contactors coupled to the charging port and the drivetrain system; and
  control circuitry coupled to drivetrain system and the plurality of contactors, the control circuitry operative to:
    charge the battery using one of a native path and a legacy path based on a determination of whether power supplied to the charging port is at a native voltage level or a legacy voltage level,
    wherein the native path comprises at least one contactor of the plurality of contactors that is closed to enable the native voltage level to charge the battery; and
    wherein the legacy path comprises at least one contactor of the plurality of contactors, the motor, and the power electronics components, wherein the control circuitry controls duty cycle operation of the power electronics components such that the power electronics components and motor operate as a boost converter to boost the legacy voltage level to the native voltage level to charge the battery.

2. The system of claim 1, wherein the battery operates at the native voltage level, and wherein the native voltage level has a higher voltage level than the legacy voltage level being provided by a charging station.

3. The system of claim 1, wherein the native path comprises a pair of the plurality of contactors that are directly coupled to the battery, wherein the control circuitry is operative to activate the pair of the plurality of contactors to directly couple the charging port to the battery.

4. The system of claim 1, wherein the motor comprises at least three stators, and the power electronics components comprises an inverter, the inverter comprising three pairs of switches, wherein each pair of switches is connected to one of the at least three stators.

5. The system of claim 4, wherein the native path comprises a first one of the plurality of contactors, the motor, the power electronics components, and a second one of the plurality of contactors, wherein the first one of the plurality of contactors is coupled to the motor, wherein the power electronics components are coupled to the battery, and wherein the second one of the plurality of contactors is coupled to the battery, wherein the control circuitry is operative to:
  activate the first one of the plurality of contactors to enable current to flow from the charging port to the motor;
  activate the second one of the plurality of contactors to complete the native path; and
  turn ON a switch of at least one of the pairs of switches to connect the motor to the battery to enable the current to flow from the charging port though the motor and the at least one switch that is ON to the battery.

6. The system of claim 5, wherein the first one of the contactors is connected to a center tap of the at least three stators, and wherein one switch in each pair of switches is turned ON and the other switch in each pair of switches is turned OFF.

7. The system of claim 5, wherein the first one of the contactors is connected to an AC input of a first one of the three stators, and first, second, and third pairs of switches are connected to the first, second, and third stators, respectively, wherein both switches in the first pair are turned OFF, and wherein one switch of each the second and third pairs is turned ON and the other switch in each pair of the second and third pairs is turned OFF.

8. The system of claim 4, wherein, when using the legacy path, the control circuitry is operative to:
  activate first and second contactors of the plurality of contactors, wherein the first contactor is coupled to the motor and the second contactor is connected to the battery and the power electronics components via a common bus; and
  duty cycle control at least one pair of switches to boost the legacy voltage level to the native voltage level.

9. The system of claim 8, wherein the first contactor is connected to a center tap of the three stators, and wherein the control circuitry is operative to duty cycle control each pair of switches to boost the legacy voltage level to the native voltage level.

10. The system of claim 8, wherein the first one of the contactors is connected to an AC input of a first one of the three stators, and first, second, and third pairs of switches are connected to the first, second, and third stators, respectively, wherein the control circuitry is operative to:
  turn both switches in the first pair OFF; and
  duty cycle control the second and third pairs of switches to boost the legacy voltage level to the native voltage level.

11. The system of claim 1, wherein the control circuitry is operative to control the power electronics components to convert DC power supplied by the battery to AC power to drive the motor.

12. A method for charging a battery in a vehicle transportation system comprising a port, a plurality of contactors, a battery, a motor, and power electronics components, the method comprising:
  determining whether supply power voltage available at the port is provided at a legacy voltage level or a native voltage level;
  if the supply power voltage is provided at the legacy voltage level:
    activating at least two of the plurality of contacts to supply power to the battery via a legacy path, the legacy path comprising the motor and the power electronics components; and controlling operation of the power electronics components to boost the supply power voltage from the legacy voltage level to the native voltage level such that the battery is charged at the native voltage level; and if the supply power voltage is provided at the native voltage level:
activating at least two of the plurality of contacts to supply power to the battery via a native path such that battery is charged at the native voltage level.

13. The method of claim 12, wherein controlling operation of the power electronics components to boost the supply power voltage from the legacy voltage level to the native voltage level comprises:
operating the motor and the power electronics components as a boost converter to up-convert the legacy voltage level to the native voltage level.

14. The method of claim 13, wherein the motor comprises at least three stators, and the power electronics components comprises an inverter, the inverter comprising three pairs of switches, wherein each pair of switches is connected to one of the at least three stators, the method further comprising:
controlling a duty cycle of each pair of switches to control the boost converter.

15. The method of claim 12, wherein the native path comprises a pair of the plurality of contactors that is directly coupled to the battery, wherein activating at least one of the plurality of contacts comprising activating the pair of plurality of contactors to directly couple the port to the battery.

16. The method of claim 12, wherein the native path comprises first and second contactors of the plurality of contactors, the motor, and the power electronics components, the method further comprising:
activating the first one of the plurality of contactors to enable current to flow to the motor;
activating the second one of the plurality of contactors to close the native path; and
controlling operation of the power electronics components to connect the motor to the battery to enable the current to flow from the port though the motor and the power electronics components to the battery.

17. Battery charging circuitry comprising:
a charging port;
a motor comprising first, second, and third stators;
an inverter comprising first, second, and third phase switches coupled to the first, second, and third stators, respectively;
a first bus coupled to the inverter and a positive terminal for a battery;
a second bus coupled to the inverter and a negative terminal for the battery;
a first contactor coupled to the charging port, the third stator and the third phase switches;
a second contactor coupled to the charging port and the second bus; and
control circuitry operative to:
route power to the positive terminal via a native path when a supply voltage is determined to be a native voltage level; and
route power to the positive terminal via a legacy path when the supply voltage is determined to be a legacy voltage level.

18. The battery charging circuitry of claim 17, wherein the native path comprises the first contactor, the motor, and the second and third phase switches, wherein the control circuitry is operative to:
turn the third phase switches OFF;
connect the second stator to the first bus by turning one of the first phase switches ON; and
connect the third stator to the first bus by turning one of the second phase switches ON.

19. The battery charging circuitry of claim 17, wherein the legacy path comprises the first and second contactors, the motor, and the inverter, wherein the control circuitry is operative to:
turn the third phase switches OFF; and
duty cycle control the first and second phase switches to boost the legacy voltage level to the native voltage level by using the first and second stators and the first and second phase switches as part of a boost converter.

20. The battery charging circuit of claim 17, wherein battery operates at the native voltage level, and wherein the native voltage level has a higher voltage level than the legacy voltage level.

* * * * *